US007074295B2

(12) United States Patent
Bellafore et al.

(10) Patent No.: US 7,074,295 B2
(45) Date of Patent: Jul. 11, 2006

(54) LABELLING APPARATUS AND METHOD FOR CORRECTING VISUAL ADHESIVE DEFECTS

(75) Inventors: Bryan Bellafore, Newark, DE (US); Paul D. Fussey, West Chester, PA (US)

(73) Assignee: Applied Extrusion Technologies, Inc., New Castle, DE (US)

( * ) Notice: Subject to any disclaimer, the term of this patent is extended or adjusted under 35 U.S.C. 154(b) by 206 days.

(21) Appl. No.: 10/758,756

(22) Filed: Jan. 16, 2004

(65) Prior Publication Data

US 2005/0000643 A1 Jan. 6, 2005

Related U.S. Application Data

(60) Continuation-in-part of application No. 10/346,905, filed on Jan. 17, 2003, now Pat. No. 6,855,226, which is a division of application No. 09/875,222, filed on Jun. 6, 2001, now Pat. No. 6,517,661, which is a continuation-in-part of application No. 09/704,491, filed on Nov. 2, 2000, now Pat. No. 6,514,373, which is a continuation-in-part of application No. 09/588,333, filed on Jun. 6, 2000, now Pat. No. 6,551,439.

(60) Provisional application No. 60/488,314, filed on Jul. 18, 2003.

(51) Int. Cl.
*B32B 37/12* (2006.01)

(52) U.S. Cl. ............. 156/291; 156/275.7; 156/DIG. 34

(58) Field of Classification Search ..................... None
See application file for complete search history.

(56) References Cited

U.S. PATENT DOCUMENTS

| | | | |
|---|---|---|---|
| 2,725,156 | A | 11/1955 | Manas |
| 2,830,724 | A | 4/1958 | Manas |
| 2,860,804 | A | 11/1958 | Sherrington |
| 3,116,193 | A | 12/1963 | Ehlenbeck |
| 3,658,630 | A | 4/1972 | Stauber |
| 3,823,050 | A | 7/1974 | La Mers |

(Continued)

FOREIGN PATENT DOCUMENTS

DE 35 04 164 A 8/1986

(Continued)

OTHER PUBLICATIONS

Krones Publication #D-UT0-00-100-E, Date: Jan. 20, 1997, Revision 07, Basics of Rotary Labeling (Cold Glue).

*Primary Examiner*—Jessica Rossi
(74) *Attorney, Agent, or Firm*—Caesar,Rivise, Bernstein, Cohen & Pokotilow, Ltd.

(57) ABSTRACT

A method of correcting defects in a label resulting from a non-uniform application of adhesive to a surface of the label prior to applying the label to a container includes the steps of applying an adhesive to a surface of a label in a non-uniform manner to cause sections of the surface to be substantially devoid of the adhesive, and after applying the adhesive, applying a fluid in these latter sections to substantially fill them. The fluid is applied either onto the container in regions that are aligned with the label sections that are devoid of adhesive, or is applied directly onto the adhesive-free label sections. An apparatus for carrying out the above method also forms a part of the present invention.

10 Claims, 6 Drawing Sheets

U.S. PATENT DOCUMENTS

| | | | |
|---|---|---|---|
| 3,904,466 A | | 9/1975 | Jones et al. |
| 3,938,698 A | | 2/1976 | McDavid, Jr. et al. |
| 3,953,278 A | | 4/1976 | Smith et al. |
| 3,982,185 A | | 9/1976 | Shinn et al. |
| 4,072,552 A | | 2/1978 | Ewing |
| 4,123,310 A | | 10/1978 | Varon et al. |
| 4,181,752 A | | 1/1980 | Martens et al. |
| 4,272,311 A | | 6/1981 | D'Angelo et al. |
| 4,279,687 A | | 7/1981 | Buchholz et al. |
| 4,547,250 A | | 10/1985 | Murayama |
| 4,721,544 A | | 1/1988 | Zodrow et al. |
| 4,861,621 A | | 8/1989 | Kanzaki |
| 4,946,531 A | | 8/1990 | Crouch et al. |
| 4,977,006 A | | 12/1990 | Smith et al. |
| 5,028,290 A | | 7/1991 | Cruiel |
| 5,152,858 A | | 10/1992 | Winter |
| 5,174,852 A | | 12/1992 | Zepf |
| 5,215,622 A | | 6/1993 | Schmelzer |
| 5,234,730 A | | 8/1993 | Lautenschlaeger et al. |
| 5,290,388 A | | 3/1994 | Zepf |
| 5,427,642 A | | 6/1995 | Akiguchi et al. |
| 5,458,729 A | | 10/1995 | Galchefski et al. |
| 5,464,495 A | | 11/1995 | Eder |
| 5,466,325 A | | 11/1995 | Mizuno et al. |
| 5,518,569 A | | 5/1996 | Achilles et al. |
| 5,658,631 A | | 8/1997 | Bernstein et al. |
| 5,705,024 A | | 1/1998 | Bainbridge et al. |
| 5,714,269 A | | 2/1998 | Munoz Madrid |
| 5,747,551 A | * | 5/1998 | Lewandowski et al. ....... 522/95 |
| 5,785,803 A | | 7/1998 | Schiessl |
| 5,843,598 A | | 12/1998 | Ueda et al. |
| 5,885,401 A | | 3/1999 | Eiban |
| 5,893,958 A | | 4/1999 | Cummings et al. |
| 5,897,722 A | | 4/1999 | Bright |
| 5,992,314 A | | 11/1999 | Lorenz et al. |
| 6,007,658 A | | 12/1999 | Calvert |
| 6,009,926 A | | 1/2000 | Vicktorius et al. |
| 6,013,693 A | | 1/2000 | Takahashi et al. |
| 6,024,830 A | | 2/2000 | Nedblake et al. |
| 6,187,432 B1 | * | 2/2001 | Krish et al. ................. 428/343 |
| 6,242,504 B1 | | 6/2001 | Meyer-Roscher et al. |
| 6,290,119 B1 | * | 9/2001 | Reese et al. ................. 229/4.5 |
| 6,401,787 B1 | | 6/2002 | Tsutsumi et al. |
| 6,596,359 B1 | * | 7/2003 | Roth et al. ................. 428/40.1 |
| 2003/0127184 A1 | | 7/2003 | Longmoore |

FOREIGN PATENT DOCUMENTS

| | | |
|---|---|---|
| DE | 197 49 632 C1 | 11/1997 |
| GB | 2 321 044 A | 7/1998 |
| WO | WO 97/35290 | 9/1997 |
| WO | WO 99/55517 | 11/1999 |

* cited by examiner

LABELLING APPARATUS AND METHOD FOR CORRECTING VISUAL ADHESIVE DEFECTS

RELATED APPLICATIONS

This application is a nonprovisional application of provisional application Ser. No. 60/488,314, filed Jul. 18, 2003, titled Labeling Apparatus and Method Employing Radiation Curable Adhesive. This application also is a continuation-in-part of application Ser. No. 10/346,905, filed Jan. 17, 2003, now U.S. Pat. No. 6,855,226 titled Labeling Method Employing Radiation Curable Adhesive, which in turn is a divisional application of Ser. No. 09/875,222, filed Jun. 6, 2001, titled Labeling Apparatus and Method Employing Radiation Curable Adhesive, now U.S. Pat. No. 6,517,661, titled Labeling Method Employing Radiation Curable Adhesive, which in turn is a continuation-in-part of application Ser. No. 09/704,491, filed Nov. 2, 2000, titled Labeling Apparatus and Method Employing Radiation Curable Adhesive, now U.S. Pat. No. 6,514,373, titled Labeling Method Employing Radiation Curable Adhesive, which in turn is a continuation-in-part of application Ser. No. 09/588,333, filed Jun. 6, 2000, and titled Ultraviolet Labeling Apparatus and Method, now U.S. Pat. No. 6,551,439. The subject matter of the aforementioned '314 and '905 applications and of the '661, '373 and '439 patents is hereby fully incorporated by reference herein.

FIELD OF THE INVENTION

This invention relates generally to a labeling apparatus and method for applying labels to containers, and more particularly to a labeling apparatus and method for correcting visual defects in labels created by the omission of adhesive from regions of the label facestock when adhesive initially is applied to said facestock. The labels employable in this invention are in the form of plastic, sheet fed, cut and stack labels, and can be formed of films that are transparent or opaque (including metallized films). The adhesive initially applied to the facestock, in accordance with the broadest aspects of this invention, can be any of a variety of types, including, but not limited to, cold seal adhesives and radiation curable adhesives, e.g., ultraviolet radiation (UV) curable adhesives, electron-beam radiation curable adhesives and radio-frequency radiation curable adhesives.

BACKGROUND ART

A number of prior art systems exist for applying labels to containers, either continuous roll fed labels or cut and stack labels.

Apparatus and method commonly employed to apply sheet fed, cut and stack labels (i.e., labels that have been cut offline and thereafter retained in a stack within a dispensing magazine) to containers, such as bottles, selectively apply an adhesive to the lowermost label in the dispensing magazine while, at the same time, removing the lowermost label from the stack for subsequent application to a container. Such systems have employed cold glue adhesive, which is water soluble, and sometimes a hot melt adhesive. In addition, radiation curable adhesives are being utilized by applicant's assignee, as disclosed in the various related applications and issued patents identified earlier in this application.

In apparatus and method commonly employed for directing, in sequence, individual sheet fed, cut and stack labels from a dispensing magazine, adhesive initially is applied to a transfer pad that subsequently engages a confronting surface of the lowermost label in the magazine for both applying the adhesive to the label and removing the label from the stack. The adhesive is applied substantially uniformly over the confronting surface of the label, except in regions corresponding to cut out sections of the transfer pad. These cut out sections are provided to permit a label carried by the transfer pad to be engaged in the region of the cutouts by gripper fingers of a subsequent transfer mechanism that conveys the labels to their point of application to the containers.

Although equipment employing a transfer mechanism with the above-described fingers has been commercially utilized for years, a problem does exist in achieving uniformity in the adhesive layer, particularly in the regions of the label corresponding to the cutout sections of the transfer pad. Non-uniformity in the adhesive layer creates visual defects when the label is applied to a container. These visual defects are most pronounced in transparent labels, where bubbles and voids are readily apparent by visual inspection through the label. Moreover these visual defects can present a problem even in opaque labels, when the labels are reverse printed on the adhesive side for viewing through a container that includes a relatively clear fluid (e.g., beer) in it.

Although cold glue adhesives and radiation curable adhesives have been applied in a manner to permit them to cold flow into the regions of the label initially devoid of adhesive, this flow has not always been uniform, still resulting in the formation of bubbles, striations and other imperfections in the adhesive layer that are visually discernable and aesthetically unappealing.

Therefore, a need exists to further eliminate visual defects in labels created by the omission of adhesive from regions of the label facestock at such time as the adhesive initially is applied to said facestock. It is to such improvements that the present invention relates.

SUMMARY OF THE INVENTION

A method of correcting defects in a label resulting from a non-uniform application of adhesive to a surface of the label prior to applying the label to a container includes the steps of applying an adhesive to a surface of a label in a non-uniform manner to cause regions of the surface to be substantially devoid of the adhesive, and after applying the adhesive, applying a fluid in the regions that are substantially devoid of the adhesive to substantially fill said regions with said fluid.

In a preferred form of the method the fluid is applied directly to the container on which the label is to be applied, in locations that are in substantially alignment with the regions of the label that are substantially devoid of the adhesive.

In an alternative method the fluid is applied directly to the label in the regions of the label surface that are substantially devoid of the adhesive.

Most preferably the fluid applied either to the container or to the label has a clarity compatible with the clarity of the adhesive initially applied to the label, has a relatively low volatility, has desirable flow characteristics and can be either an adhesive or a non-adhesive fluid. Exemplary non-adhesive materials are mineral oil, glycerin, fatty acid alcohol, other glycols (e.g., epoxy end-capped polypropylene glycol and alcohol flow aids such as proproxylated neopentyl glycol) and vegetable oil. Suitable adhesives that can be employed to fill in the regions devoid of adhesive are radiation curable adhesives and cold glue adhesives. Most desirably when an adhesive is employed it is the same or similar to the adhesive initially applied to the label.

An apparatus in accordance with this invention continuously applies plastic labels to containers and includes: a rotatable applicator roll for receiving an adhesive on the outer surface thereof; a rotatable transfer member including a plurality of transfer pads carried thereon, said transfer member being located to rotate the transfer pads in close proximity to the outer surface of the applicator roll, whereby adhesive from the roll is transferred to an outer surface of each of said pads; a dispensing magazine for retaining a plurality of individual labels in a stack, with the lowermost label in the stack being located in a down stream path of travel of the transfer pads after each of said transfer pads has engaged the outer surface of the applicator roll to receive adhesive thereon, each of said pads, with the adhesive thereon being rotated into close proximity with the lower surface of the lowermost label in the magazine for selectively applying the adhesive to the lower surface of said lowermost label in the stack in a manner that leaves at least one region of the lower surface substantially free of adhesive and for removing said lowermost label from the stack through surface adhesion to releasably secure the lowermost label to each of said transfer pads; a second rotating transfer member for receiving said labels from the transfer pads prior to said labels being applied to a container; and a device for applying a fluid in the at least one region to substantially fill said at least one region with said fluid.

In a preferred apparatus in accordance with this invention the device for applying fluid in said at least one region applies the fluid directly to the container on which the label is applied, in a selected region that aligns with the at least one region of the label surface that is substantially free of adhesive prior to the label being applied to the container.

In accordance with this invention, the apparatus can include a device for applying a fluid directly to the label in the at least one region that is substantially free of the adhesive prior to the label being applied to the container.

In accordance with one aspect of the invention, the adhesive initially applied to the label is a radiation curable adhesive, and the apparatus further includes a radiation cure station that includes the second rotating transfer member, said second rotating transfer member directing the labels through a radiation cure section of the radiation cure station to thereby partially cure the adhesive to increase the tackiness of the adhesive prior to the label being applied to a container.

In accordance with a preferred construction, each of the transfer pads includes a recess extending inwardly from a side edge, each of said transfer pads removing a lowermost label from the stack with a region of the label overlying said recess being free of adhesive.

BRIEF DESCRIPTION OF THE DRAWING

Other objects and many attendant features of this invention will become readily appreciated as the same becomes better understood by reference to the following detailed description when considered in connection with the accompanying drawings wherein.

DESCRIPTION OF THE PREFERRED EMBODIMENT OF THE INVENTION

As noted earlier herein, the present invention is usable in labeling methods and apparatus employing different types of adhesives for securing the label to a container. Representative methods and apparatus employ either a cold glue adhesive or a radiation curable adhesive to secure the label to the containers. In accordance with one preferred method and apparatus, a radiation curable adhesive, in the form of a UV curable adhesive, is employed to adhere individual labels to containers.

Prior to disclosing the unique features of the methods and apparatus for correcting visual adhesive defects, the overall features of a method and apparatus for applying labels to containers employing a radiation curable adhesive will be described. Thereafter, the unique features employed to correct visual adhesive defects in the label will be described, it being understood that these unique features are usable in other apparatus and method in which adhesives other than radiation curable adhesives are employed.

Figure 1:
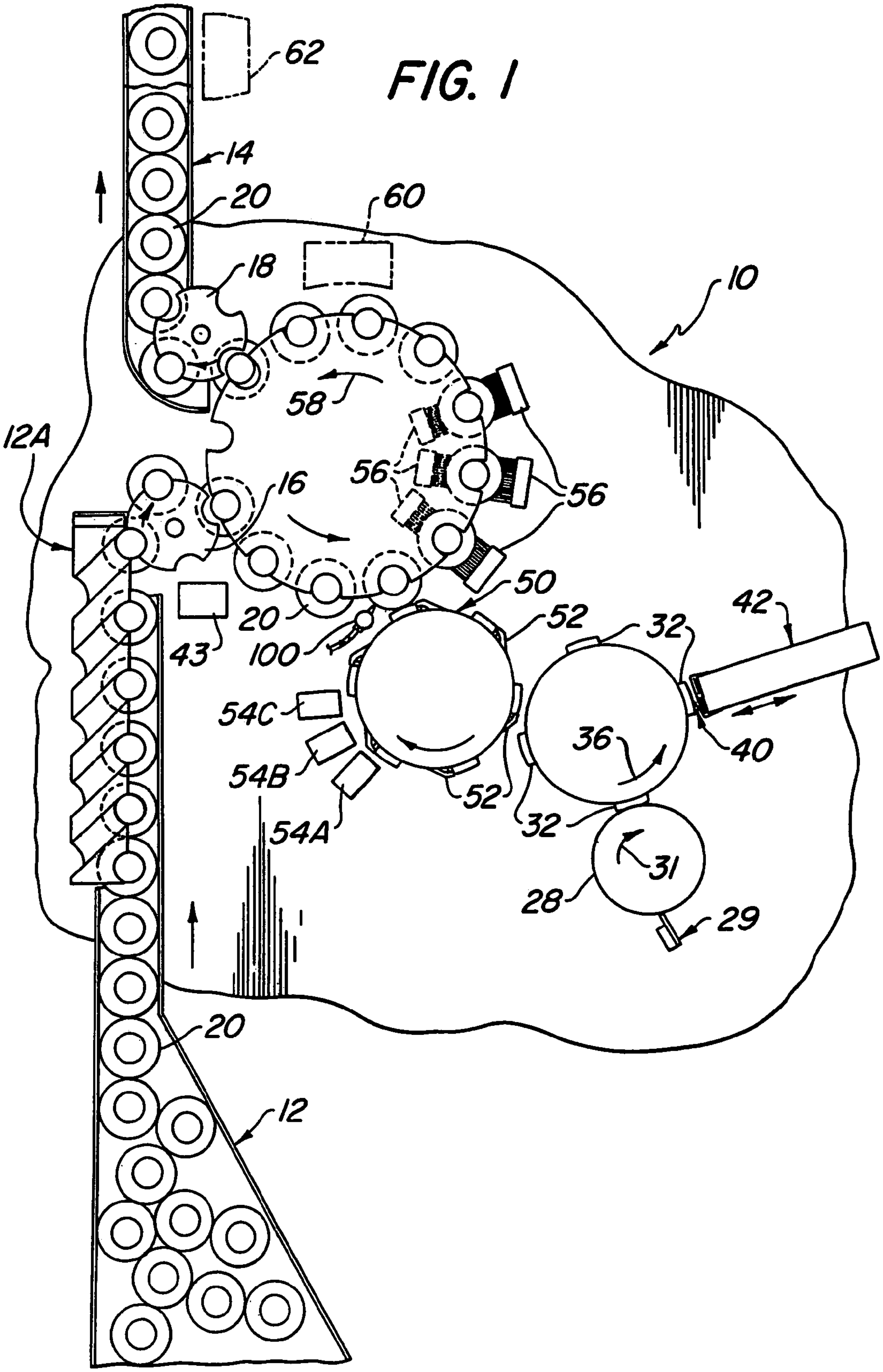
FIG. 1 is a schematic, plan view illustrating the method and apparatus of this invention.

General Description of Method and Apparatus for Applying Labels to Containers Utilizing Radiation Curable Adhesive Referring to FIG. 1, a method and apparatus for applying labels to containers employing features of this invention are shown generally at 10. While the illustrated embodiment of this invention employs an adhesive curable by radiation with ultraviolet light, i.e., a UV curable adhesive, in accordance with this invention other radiation curable adhesives may be employed, e.g., adhesives curable by radio frequency radiation or electron beam radiation. For brevity of discussion, this invention will be described in connection with the embodiment employing a UV curable adhesive. However, with respect to embodiments of this invention employing a radiation curing step after the label has been applied to the container, electron beam radiation may be a preferred form of radiation.

Still referring to FIG. 1, the illustrated method and apparatus employs an inlet conveyor section 12, an outlet conveyor section 14 and rotating bottle-transfer members 16 and 18 for transferring bottles 20 from the inlet conveyor section to a rotating turret 22, and for removing bottles from the rotating turret to the exit conveyor section 14, respectively, after the bottles have been directed through label application station 24. However, an in-line system could be employed, which does not require the use of a rotating turret to handle the bottles, or other containers, during the label application operation.

It should be understood that the construction of the inlet conveyor section 12, outlet conveyor section 14, rotating bottle-transfer members 16 and 18 and rotating turret 22 are all of a conventional design that have been employed in prior art labeling apparatus and methods utilizing other types of adhesives, e.g., cold glue adhesives. For example, KRONES manufactures a line of rotary labeling equipment including an inlet conveyor section 12, an outlet conveyor section 14, rotating bottle-transfer members 16 and 18 and a rotating turret 22 of the type that can be employed in the present invention. Therefore, a detailed discussion of these features is not required herein.

Figure 3:
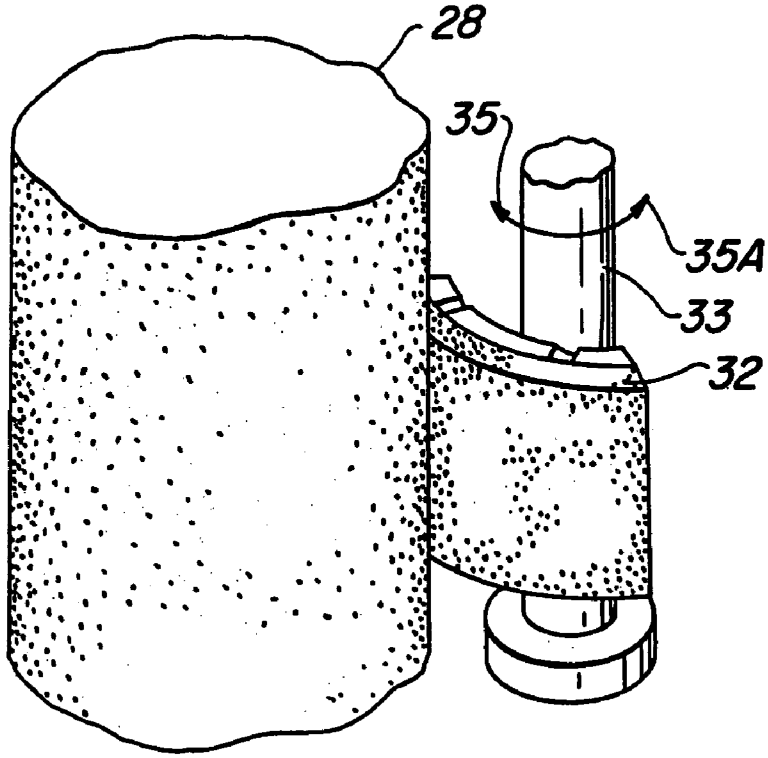
FIG. 3 is an enlarged, fragmentary, isometric view of a portion of the adhesive application station wherein an adhesive is transferred to the exposed surface of a rotating transfer pad, prior to the transfer pad being directed into a transfer station for receiving a label thereon.

Referring specifically to FIGS. 1 and 3, the illustrated method and apparatus of this invention employ an adhesive application station 26 that includes a gravure or anilox applicator roll 28 of the type that generally is used in gravure or flexographic printing systems, respectively. This roll must have a sufficient surface hardness to avoid the creation of imperfections therein, and sufficient release properties to release the adhesive carried thereby to transfer pads 32, which preferably have smooth outer surfaces, for subsequent application from those pads to a label, as will be described in greater detail hereinafter. Preferably the transfer pads include an outer, elastomeric member, e.g., rubber or photo polymer material.

The gravure or anilox applicator roll 28 usable with a UV curable adhesive is employed with a doctor blade 29 of conventional design, which may be of an enclosed type, and with adjustments to allow it to be placed in contact with the surface of the gravure or anilox roll, or to be raised a desired distance away from such roll. In one form of the invention the adhesive is circulated from an adhesive supply chamber positioned below the vertically mounted applicator roll 28 through a suitable conduit to the outer surface of the roll adjacent the upper axial end thereof. The adhesive flows down the surface of the roll 28 as the roll is being rotated in the direction of arrow 31 (FIG. 1), filling the cells therein and actually applying a coating that extends beyond the surface of the roll. Adhesive that does not adhere to the roll is collected in a base section in which the roll is mounted and flows through a return conduit to the adhesive supply chamber to be recirculated. This type of system is well known for use with cold glue adhesives and therefore no further explanation is believed to be necessary in order to enable a person skilled in the art to practice the preferred form of this invention.

It also should be noted that other systems, such as spray or slot-die application systems, can be employed to direct a controlled, metered layer of adhesive directly onto the surface of the transfer pads 32. When the adhesive is directed in a controlled, metered flow from a spray or slot-die application system, the surface of the transfer pad 32 for receiving that flow can be smooth, since that surface does not need to provide an independent metering function. However, if desired the adhesive-receiving surface of the transfer pad can include adhesive-receiving cells therein. Moreover, if the surface of each of the transfer pads for receiving adhesive does include adhesive-receiving cells therein, a smooth surfaced transfer roll possibly can be employed in place of a gravure or anilox roll, with the desired, or required, metered transfer onto the transfer pads being provided by the adhesive-receiving cells therein. Although the preferred arrangement of the applicator roll 28 is in a non-pressurized environment, it is within the scope of the invention to employ a pressurized system, if desired. However, the particular method of applying the adhesive does not constitute a limitation on the broadest aspects of this invention.

Within the scope of this invention, the doctor blade 29 is disposed adjacent the surface of the applicator roll 28 with a preferred gap of 2–4 mils, to effectively provide a coating of a controlled thickness of the adhesive layer that, subsequent to passing the doctor blade 29, is applied to the surface of transfer pads 32. The best design for the doctor blade 29 is a precision ground single blade wiper with an adjustable pitch, although other doctoring systems can be employed within the broadest aspects of this invention. In the preferred embodiment of the invention the doctor blade 29 is positioned in contact with the roll surface to essentially meter all the adhesive off the roll except for the adhesive retained within the cells in the roll surface. In a representative embodiment of the invention the roll 28 is a ceramic engraved roll having quad cells present in a concentration of 75 cells per inch. For some applications, it may be suitable to utilize, as the applicator roll 28, a plain rubber roll. Therefore, in accordance with the broadest aspects of this invention, the applicator roll need not include cells for receiving adhesive therein and can be of any desired construction.

In the preferred embodiments of this invention, the surface material or coating, the cell size and concentration of cells in the surface of the gravure or anilox roll 28 and the position of the doctor blade 29 are selected to carry a sufficient quantity of adhesive to provide the desired adhesive coat weight on the labels. When utilized to adhere clear labels to clear containers, the coat weight on the labels preferably should be at least 6 pounds per ream and more preferably in the range of 7 to 8 pounds per ream or even greater. However, the coat weight applied to the labels should not be so high as to result in excessive adhesive run-off from the transfer pads 32 to which the adhesive initially is applied. The coat weight applied to clear labels desirably should provide a sufficient thickness to permit at least some cold flow of the adhesive when the label is on the bottle to cause the adhesive to fill in unsightly striations or other adhesive imperfections that initially may be exist when the label is adhered to the container. In a representative embodiment of this invention the thickness of the adhesive layer on the clear label, prior to applying the label to a container, is in the range of 0.5 to 1 mils and preferably does not exceed 1.5 mils. However, as will be discussed in greater detail hereinafter, the adhesive is deliberately omitted from selected side regions of the label that are intended to be gripped by gripper fingers of a transfer member, for conveying the labels through the method and apparatus. The cold flow of adhesive at least partially into these selected side regions often leaves undesired visual imperfections in the adhesive layer, both in the regions into which the adhesive flows, as well as in other regions from where the adhesive flows.

It should be understood that the adhesive does not need to have a thickness on the label of 1 or more mils to provide the desired degree of tack to adhere the label to the container. This thickness is desired to permit cold flow of the adhesive after the label is adhered to a container to permit the adhesive to at least partially fill in unsightly striations in the circumferential direction, or other unsightly adhesive imperfections, a feature that is particularly desirable when applying clear labels to containers.

When this invention is employed to adhere opaque labels to a container, the target basis weight of the adhesive coat applied to the label is approximately 2.5 pounds per ream, but can be higher, or lower, as is determined to be necessary to achieve the desired bond strength between the label and container. Although the adhesive may not cold flow to fill in gaps in the adhesive layer, this generally will not create an unacceptable appearance in opaque labels, particularly if the rear side of the label is not viewable from the rear side of the container, e.g., when the contents in the container are not clear.

Still referring to FIG. 1, the gravure or anilox applicator roll 28 is driven in the direction of arrow 31, past the doctor blade 29. Thus, the exposed outer surface of the gravure or anilox applicator roll 28 receives a metered amount of UV curable adhesive on its surface, which is then engaged by the outer exposed surfaces of the transfer pads 32 disposed about the periphery of a rotating support member 34 that is rotated in the direction of arrow 36.

Referring specifically to FIGS. 1 and 3, it should be noted that each of the transfer pads 32, the surface of which preferably is made of rubber or other suitable material, e.g., a photo polymer of the type used in a flexographic system, is mounted on the rotating support member 34 through a support shaft 33 mounted for oscillatory motion relative to the support member, as represented by the arrow heads 35 and 35A in FIG. 3. This oscillatory motion is provided by a cam drive arrangement that is well known to those skilled in the art, and is one that actually is employed in conventional cut and stack or sheet fed labeling systems, for example manufactured by KRONES AG in West Germany or KRONES, Inc. in Franklin Wis. (Krones AG and Krones, Inc. hereinafter collectively being referred to as "KRONES").

The transfer pads 32 preferably are formed of a smooth surfaced elastomer (natural or synthetic) having a Shore A hardness in the range of about 50 to about 90. This elastomer has been determined to provide reasonably good final adhesive visual properties when employed to adhere clear labels to a bottle, except in the surface regions of the label aligned with recess regions 32A in at least one side edge of each transfer pad 32. In the preferred embodiment of this invention, the transfer pads 32 are oscillated in the counterclockwise direction of arrow 35A, as viewed in FIG. 1, as each pad is moved in contact with the gravure roll 28 by rotation of the support member 34, to thereby cause the UV curable adhesive on the gravure roll to be applied substantially uniformly to each transfer pad.

Figure 4:
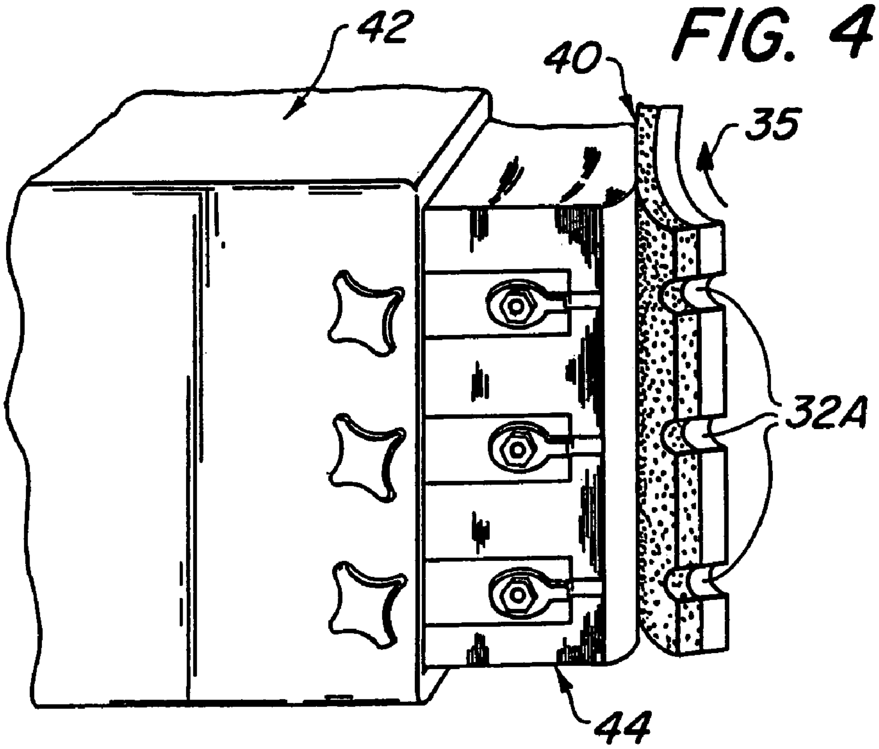
FIG. 4 is an enlarged, fragmentary, isometric view illustrating the engagement of a rotating transfer pad with an adhesive thereon with the lowermost label in a stack of said labels.

Referring to FIGS. 1 and 4, the transfer pads 32, with the UV curable adhesive thereon, are then directed sequentially by the rotating member 34 to a transfer station 40. The transfer station 40 includes a magazine 42 retaining a stack of cut labels 44 therein. This magazine 42 is mounted for linear reciprocating motion toward and away from the exposed surface of the transfer pads, respectively, as is well known in the art. The linear reciprocating movement of the magazine 42 is controlled by a conventional photo detection system 43 positioned to detect the presence of a container at a specified location, preferably at the downstream end of helical feed roll 12A, of the inlet conveyor 12, as is well known in the art. If a container is detected at the specified location on the inlet conveyor 12, the magazine 42 will be moved into, or maintained in a forward position for permitting a desired transfer pad 32 to engage and remove the lowermost label from the stack of cut labels 44 retained in the magazine. The desired transfer pad 32 is the one that receives a label that ultimately will be aligned with the detected container when that container is in label applicator section 24 of the rotating turret 22, to thereby transfer, or apply, the label to the container, as will be described in detail hereinafter. If a container is not detected at the specified location by the photo detection system 43, then the magazine 42 will be retracted to preclude a predetermined transfer pad 32 from engaging and receiving the lowermost label in the magazine 44, which label ultimately would have been directed to an empty container position at the label applicator section 24 on the turret 22 resulting from a container not being in the specified location being monitored by the photo detection system.

Still referring to FIGS. 1 and 4, when a transfer pad 32 is in a position aligned for engaging the lowermost label 44 carried in the magazine 42, that pad is oscillated in the clockwise direction of arrow 35, as viewed in FIG. 1, for engaging the lowermost label 44 in the magazine 42 to both apply the adhesive to that label and remove that label from the stack through surface adhesion with the minimally tacky adhesive.

The mechanical systems employing the oscillatory transfer pad 32 and the reciprocal magazine 42 are well known in the art; being employed in commercially available cut and stack label applying systems manufactured, for example, by Krones. These mechanical systems do not form a part of the present invention. Therefore, for purposes of brevity, details of construction of these systems are omitted.

Figure 5:
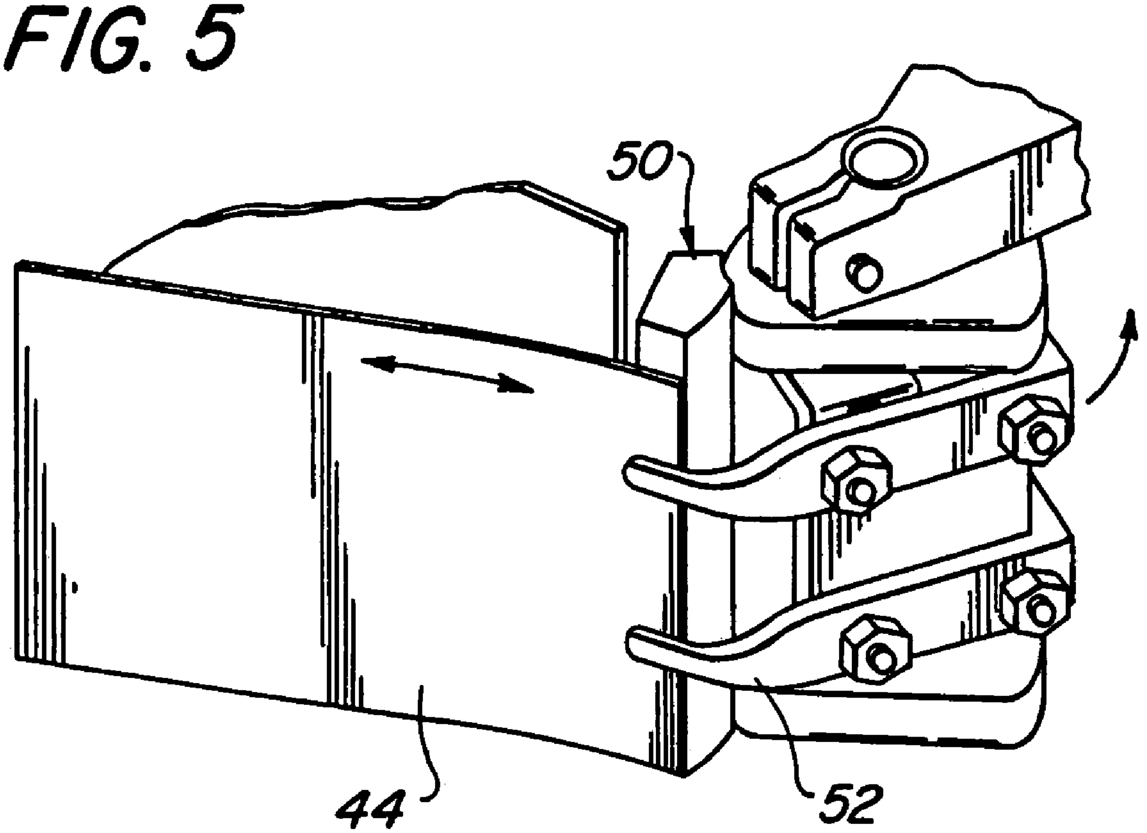
FIG. 5 is an enlarged, fragmentary, isometric view illustrating, in schematic form, the retention of a label on a second transfer assembly that directs the label to a label application station.

Referring to FIGS. 1 and 5, the transfer pads 32, with the labels thereon, are then rotated by the support member 34 to a transfer assembly shown generally at 50. This transfer assembly includes a plurality of cam operated gripping members 52 disposed about the periphery thereof for engaging labels 44 carried by the transfer pads 32 and transferring the labels to the transfer assembly 50. The transfer assembly 50 is of a conventional design, and therefore the details of this assembly, including the cam operation of the gripping members 52, are omitted for purposes of brevity. Suffice it to state that the gripping members 52 engage the labels 44 carried on the transfer pads 32 in the regions of the labels aligned with cut-outs 32A in the transfer pads 32, as is best illustrated in FIGS. 3 and 4. During transfer of the labels to the transfer assembly 50 the pads 32 are oscillated in the counterclockwise direction of arrow 35A, as viewed in FIG. 1. It should be emphasized that the individual labels do not include any adhesive in the regions engaged by the gripping members 52, as these gripping members grip the labels in the regions aligned with cut-outs 32A. The provision of these cut-outs precludes adhesive from being directly applied to the label regions aligned therewith.

Referring again to FIG. 1, in accordance with this invention the rotary transfer assembly 50, with labels 44 thereon, can be directed through an irradiating section in the form of a UV cure section, which can be the same as the UV cure section 54 disclosed in U.S. Pat. No. 6,517,661 when the containers with the labels thereon are subject to one or more subsequent curing steps, as will be described in greater detail later in this application. Moreover, in accordance with this invention when one or more curing steps are provided after the label has been attached to the container, it may not be necessary to provide any cure section for curing the adhesive on the label prior to application of the label on the container.

Alternatively, the UV cure station can include a multi-lamp system, such as one employing separate lamps 54A, 54B and 54C, some or all of which emit UV radiation of different wavelengths to provide, respectively, the primary curing action in the interior region of the adhesive layer, followed by a cure focused primarily at the exposed surface of the adhesive layer. When using this latter, multi-lamp system, it may not be necessary to provide a subsequent cure step after the label has been applied to the container. However, if desired or necessary, one more curing operations can be provided after the label is attached to the container, if needed.

In an exemplary embodiment of the invention, the lamps 54A and 54C of the cure station each employs an iron-doped metal halide bulb (type D) that emits UV radiation in the wavelength range of 350–450 nanometers to effect a primary curing action in the interior region of the adhesive layer, and the lamp 54B employs a mercury vapor bulb (type H) that emits UV radiation in the wavelength range of 250–350 nanometers to effect a primary curing action at the exposed surface of the adhesive layer. The use of these three lamps enhances the power output and also provides additional curing of the adhesive, principally in the interior region thereof.

If desired, additional lamps can be employed to increase the power output, thereby permitting the equipment to operate at higher speeds, or, if desired, to provide different radiation spectra, as desired.

The specific power output required of each of the lamps depends, among other factors, upon the cure rate of the specific UV curable adhesive employed and the speed of operation of the labeling equipment. The degree of cure of the adhesive is most effectively controlled by controlling the total amount of radiation of appropriate wavelength that is delivered to the adhesive. The factors affecting the total amount of radiation of appropriate wavelength delivered to the adhesive are (1) residence time of the adhesive in the light, (2) wavelength match between the adhesive and the light source, (3) distance from the light source to the adhesive, (4) intensity of the light source and (5) use of filters, absorbers or attenuators. In accordance with this invention, the use of separate bulbs to emit UV radiation of different wavelengths for the purposes described earlier herein provides for more efficient partial curing of the adhesive than employing only a single bulb; thereby permitting the processing equipment to be effectively run at higher speeds.

In an exemplary embodiment, the lamps 54A and 54B each provide a 600 watt per inch output, which provides sufficient intensity to cure both the interior and surface regions of the adhesive layer; which, as noted earlier, preferably is applied to the label film substrate at a coating thickness in the range of 0.5 to 1.0 mils, at film throughput speeds greater than 500 bottles per minute when clear plastic labels are being applied to the containers. In accordance with the present belief of the inventors, when this invention is employed with a UV curable adhesive at least two 600 watt per inch bulbs are needed to provide the desired power to cure the adhesive at speeds greater than 500 bottles/minute for clear plastic labels. As noted earlier, at present three bulbs are being employed, each having a power output of 600 watts per inch.

It should be understood that in a preferred embodiment of this invention the UV curable adhesive is in a minimally tacky state (defined earlier) until it passes through the UV cure station including lamps 54A, 54B and 54C. Thus, in the illustrated apparatus and method an excessively tacky adhesive material does not need to be handled throughout the entire processing operation. Stating this another way, the UV curable adhesive is only rendered sufficiently tacky to permit the label to be effectively adhered to the outer surface of a container at a location closely adjacent the label application station 24.

The preferred UV curable adhesives usable in this invention also are of a sufficiently low viscosity to permit the adhesive to be applied substantially uniformly over a label surface. Preferably, the viscosity of the adhesives usable in this invention is in the range of about 500 to about 10,000 centipoises; more preferably under 5,000 centipoises; still more preferably in the range of about 1,000 to about 4,000 centipoises and most preferably in the range of 2,000 to 3,000 centipoises.

UV curable adhesives are comprised of the free radical or cationic initiators and monomers which are polymerizable via these mechanisms. In accordance with this invention all of the above types of UV curable adhesives can be employed. UV curable adhesives are available form a variety of sources, e.g., H. B. Fuller, National Starch, Henkel, and Craig Adhesives & Coatings Company of Newark, N.J.

A preferred, or representative, UV curable adhesive employable in this invention, particularly when applying clear labels to containers, is an adhesive employing a combination of both free-radical and cationic initiators. Such an adhesive is available from Craig Adhesives & Coatings Company under the designation Craig C 1029 HYB UV pressure sensitive adhesive. This latter adhesive has a viscosity of approximately 2,500 centipoises. It should be noted that UV curable adhesives employing free-radical initiators have a strong initial cure but provide a poor visual appearance. On the other hand, UV curable adhesives employing cationic initiators provide weak initial cure but have good visual appearance. By employing a UV curable adhesive including a blend of these two types of initiators excellent results have been achieved. It should be noted that the aforementioned Craig pressure sensitive adhesive has experienced some problems when employed to adhere the labels to wet bottles. In particular, this adhesive has a surfactant that tends to absorb water from the bottle, which adversely affects the appearance of the adhesive, which can be seen through clear labels.

A representative UV curable adhesive system can have a free radical adhesive system that preferably has a low surface tension of 34 dynes or less and may comprise a range of acrylic monomers with a glass transition temperature (Tg) in the range of −80° C. to +100° C. that are blended to optimize the adhesive performance (i.e., tack) based on the temperature conditions at which the label is being adhered to the container. The adhesive system preferably also includes additional flowable components, which may or may not subsequently be dark cured, so as to adjust the aesthetic properties of the adhesive by flowing to fill in striations and other imperfections in the adhesive layer, after the label has been applied to the container. Exemplary flowable components are cationically polymerizable epoxy resins that are polymerized through a cationic initiator included in the adhesive system.

Still referring to FIG. 1, each of the labels 44 is directed from the UV cure station with the adhesive thereon being in at least a partially cured, sufficiently tacky condition to uniformly and effectively adhere the label to a container, and the label is then immediately rotated into a position for engaging the outer periphery of a bottle 20 carried on the turret 22 in the label application station 24. It should be noted that the spacing of the labels on the transfer assembly 50 and the speed of rotation of the transfer assembly are timed with the speed of rotation of the rotating turret 22 such that each label carried on the transfer assembly 50 is sequentially directed into engagement with an adjacent bottle carried on the rotating turret. Moreover, the photo detection system 43 prevents a label from being carried to the label application station 24 when a bottle for receiving such label is missing from that station.

Still referring to FIG. 1, each of the labels 44 is applied essentially at its midline to the periphery of an adjacent bottle 20, thereby providing outer wings extending in opposed directions from the center line of the label, which is adhered to the bottle. This manner of applying a label to a bottle is conventional and is employed in rotary labeling equipment, for example manufactured by Krones. However, in accordance with the broadest aspects of this invention, the labels can be applied to the outer surface of the bottles in any other desired way.

After a label 44 initially is adhered to a bottle 20 in the label application station 24, the rotating turret 22 directs each bottle, with the label attached thereto, through a series of opposed inner and outer brushes 56. As the bottles are directed through the series of brushes the bottles are also oscillated back and forth about their central axis to thereby create an interaction between the bottles, labels and brushes to effectively adhere the entire label to the periphery of each bottle. This brush arrangement and the system for oscillating the bottles as they move past the brushes are of a conventional design and are well known to those skilled in the art. Such a system is included in labeling equipment employing cold glue, for example labeling equipment manufactured by KRONES.

Still referring to FIG. 1, after the labels 44 have been adhered to the bottles 20, the bottles may be carried by the rotating turret in the direction of arrow 58 through a subsequent radiation station 60, if necessary, to enhance curing of the adhesive for achieving effective, permanent adherence of the label on the container. This radiation station 60 can include the same type of bulb, or bulbs, for emitting UV radiation in a desired wavelength spectra, or alternatively can employ at least two different type bulbs to emit UV radiation in more than one wavelength spectra to enhance the curing in different regions through the thickness of the adhesive layer. As noted earlier, when a UV cure station 60 is employed after the label is attached to the container, it may be possible to omit the use of a UV cure station (either single type, or multiple type bulbs) to partially cure the adhesive on the label prior to applying the label to the container. However, in accordance with this invention, when no UV cure station is employed after the label is attached to the container, the UV cure station employed to either partially or fully cure the adhesive on the label prior to applying the label to the container is a multi-bulb station employing bulbs that emit UV radiation of different wavelengths, as described earlier herein.

Still referring to FIG. 1, after the labels 44 have been effectively adhered to the bottles 20, the bottles are carried by the rotating turret 22 in the direction of arrow 58 to the bottle-transfer member 18, at which point the bottles are transferred to the outlet conveyor section 14 for subsequent packaging. As shown, a UV cure station 62 can be employed adjacent the outlet conveyor section 14 for curing the adhesive on the label attached to the container, if desired. This UV cure station can be in lieu of, or in addition to the UV cure station 60. Moreover, the UV cure station 62, like the UV cure station 60, can include the same type of bulb, or bulbs, for emitting UV radiation in a single, desired wavelength range, or alternatively can employ at least two different type bulbs to emit UV radiation in more than one wavelength range to enhance the curing in different regions through the thickness of the adhesive layer.

It should be understood that the UV curable adhesives that preferably are employed in this invention are in a minimally tacky, low viscosity state until they are exposed to UV radiation. Thus, as noted earlier herein, the apparatus and method illustrated herein are not required to handle an excessively tacky adhesive throughout the majority of the process. This provides for a cleaner running operation.

Moreover, UV curable adhesives are extremely well suited for use with clear labels since they are applied as a clear coating that does not detract from the clarity of the film. This permits clear films to be adhered to clear bottles to provide a highly attractive labeled product. Moreover, the most preferred UV curable adhesive, which is a blend of both free-radical and cationic initiators, exhibits cold flow after the label is applied to the container, to thereby at least partially fill in unsightly striations that are formed in the circumferential direction of the label, as well as other unsightly adhesive imperfections.

However, it should be noted that UV radiation may not be the most desirable system to use for curing the adhesive through the label, which is the manner of curing employed after the label is secured to the container. In this latter system, an e-beam curable adhesive may be more desirable; in which case the cure station(s) located downstream of the station at which the label is applied to the container will be an e-beam cure station(s).

As discussed above, regions of each of the labels aligned with the recesses 32A in each of the transfer pads 40 are free of adhesive. Although the adhesive is designed to cold flow, visual imperfections still tend to exist in these regions, even after the cold flow of adhesive at least partially therein. Moreover, the flow of the adhesive into the adhesive free regions creates striations and other unsightly imperfections in other regions of the label. The features of this invention for correcting these visual adhesive defects will now be described.

System for Correcting Visual Defects in Labels Resulting From a Non-Uniform Application of Adhesive to the Surface of the Label Prior to Applying the Label to a Container A major issue encountered in the application of cut and stack labels to containers is to overcome visual defects resulting from the inability of the adhesive to flow in a timely fashion into adhesive voids created by the gripper finger cut-outs on the transfer pads 32. No adhesive is coated onto the label in these areas, meaning that the glue has to be formulated to “flow” into these areas. In general, attempts to increase rate of flow of adhesive into these voided areas have not completely solved the visual defects problem in other areas of the label. In fact, the flow of adhesive into the adhesive free areas often causes unsightly bubbles to form.

In accordance with a preferred aspect of this invention, drops of fluid are selectively directed into specific locations on the surface of the container that generally coincide with the adhesive free regions on the label to be applied thereto. In other words, these drops are placed in the areas of the container that will underlie the gripper finger void areas on the label attached to said container. As noted earlier, there is no adhesive initially applied to the labels in the gripper finger void areas due to mechanical constraints of the labeling machine, i.e., the need to provide recesses 32A in the adhesive application and transfer pads 32, into which the gripper fingers need to enter for engaging and removing the labels from the pads. Absent the addition of a fluid into the adhesive free areas, the final labeled bottle may often have an unacceptable visual appearance. The present invention, in the most preferred embodiment, solves this problem by pre-applying a fluid onto the container to fill in most, if not all, of the area of the label that initially is free of adhesive when the label is applied to the container.

In accordance with this invention, applicants have determined that the fluid drops applied on the container can be an adhesive, if desired, but do not necessarily need to be an adhesive. In particular, the fluid drops introduced into the container are not required to provide an adhesive function; the initially applied adhesive being adequate to provide the necessary retention of the label onto the container.

Most importantly the fluid should be compatible with the adhesive initially applied to the label, and should have approximately the same degree of clarity (e.g., essentially the same refractive index). Most preferably the fluid introduced into the voided areas should be non-volatile to prevent evaporation, environmentally safe, and also should possess non-offensive tactile properties to avoid damaging or interfering with the operation of the equipment. In addition, the fluid should have the capability of spreading relatively fast to fill in the undesired, adhesive free areas on the label. Many fluids have the above desired properties and can be readily determined by people skilled in the art.

Applicants have determined that suitable non-adhesive fluids that can be employed are mineral oil, glycerins, fatty acid alcohols, , other glycols (e.g., epoxy end-capped polypropylene glycol and alcohol flow aids such as proproxylated neopentyl glycol) and vegetable oils. Individuals skilled in the art will be able to select other suitable fluids based on the properties that are desired, or required.

Moreover, certain adhesives also can be employed, depending on the particular make-up of the adhesive initially applied to the labels by the transfer pads. For example, when a UV curable adhesive initially is applied to the labels, the additional fluid added to the container likewise can be a UV curable adhesive, either the same as, or different from the initially applied adhesive.

Figure 2:
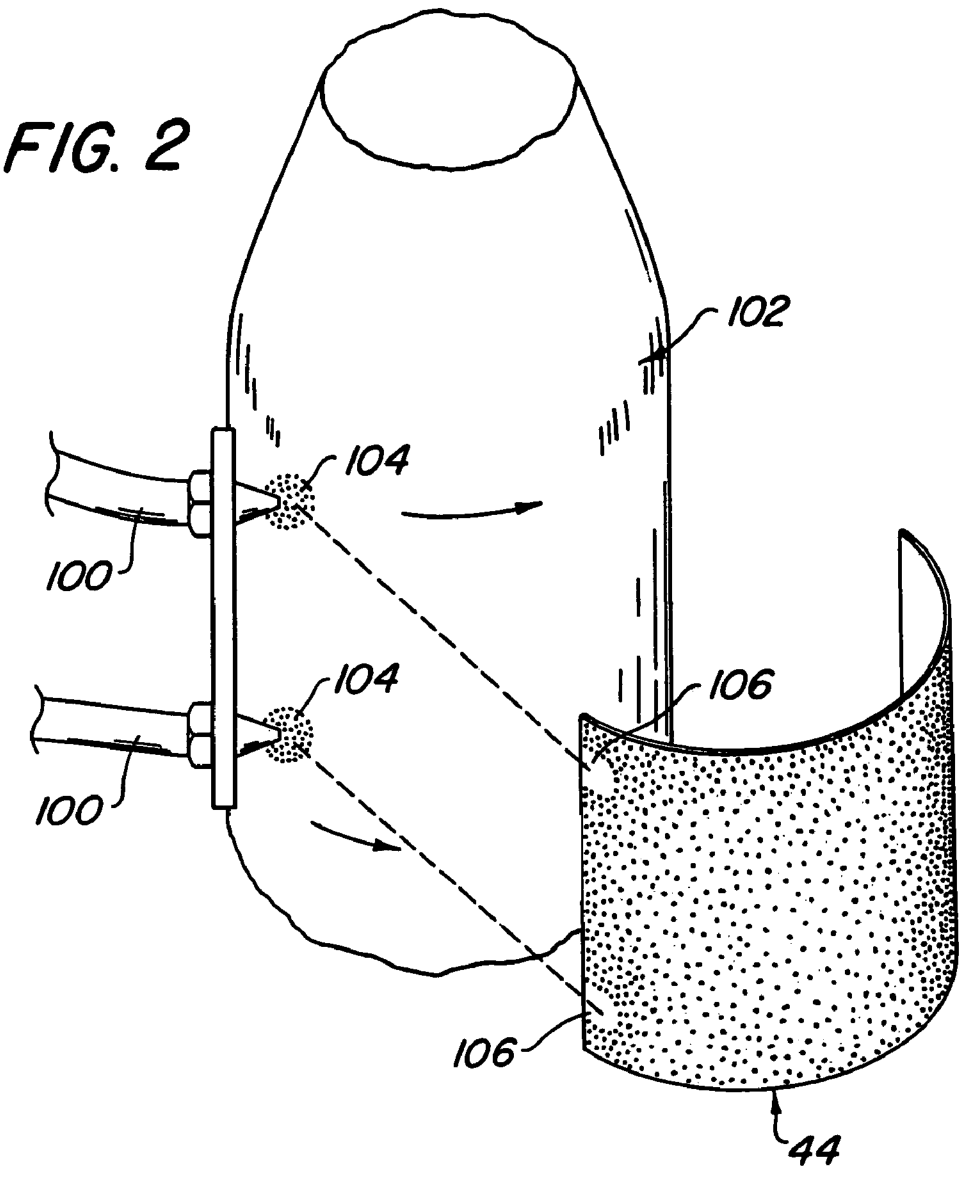
FIG. 2 is a fragmentary, exploded, isometric view illustrating the apparatus and method for applying a fluid directly to a container in predetermined regions for filling-in adhesive-free areas on a label to be applied to the container.

Referring to FIGS. 1 and 2, nozzles 100 forming part of a conventional adhesive application system are illustrated, for applying drops of a fluid onto a container 102 in regions 104 to be aligned with adhesive free region(s) 106 on the adhesive side of a label 44 to be applied to the container. In a preferred form of the invention, the application system is an ITW Dynatec cold glue adhesive application system sold by Glue Machinery Corporation, a division of Covert Company, Inc., located in Baltimore, Maryland. This system consists of a fluid reservoir, a pneumatic pump that pressurizes the fluid to be applied, an electronic high speed valve system, and nozzles 100 for applying the desired drop(s) of fluid to the container surface. The system is actuated by a 24 VDC control signal fed to an electronic driver that "fires" the valve, allowing a short adhesive spray from the nozzles.

The control signal can be generated in a number of ways well-known to those skilled in the art. One simple method is to use a photoelectric sensor to detect the container at a particular point in the process. When this detection occurs, a circuit is closed allowing the control signal to be sent to the driver. The driver then, in turn, opens the valve, initiating a single spray of each of the nozzles. In this manner, the result is a "dot" of material deposited onto the bottle surface of a particular size and volume. A more sophisticated control system would employ the labeler programmable logic controller to determine the proper machine conditions and timing to initiate a firing pulse. The exact parameters for controlling the firing operation are well within the purview of a person skilled in the art, given the information provided herein.

The pump to supply the pressurized fluid to the valve and nozzle is pneumatically powered, and various methods can be used to supply the fluid to the pump, such as a dip tube running from a container, or the pump can be directly mounted onto a fluid reservoir such as a drum or bucket.

In one exemplary embodiment the fluid is an epoxy end-capped polypropylene glycol (Dow Epoxy Resin DER 732) having a viscosity of approximately 105 cps. The invention works best with thin fluids having a viscosity in the range of 50 to 150 cps, with the maximum viscosity preferably being no greater than 6,000 cps. Preferably the nozzles 100 are controlled to deliver a "spot" of fluid, approximately 5 mm in diameter by about 0.2 mm thick, at a distance from nozzle-to-target of approximately 50 mm. Two dispensing nozzles 100, as illustrated in FIG. 2, will be used (one each for the top and bottom finger gripper 104 areas of the label that are free of adhesive). Preferably the nozzles are mounted on a stationary portion of the periphery of the turret carrying the bottles, between the in-feed star wheel and the UV lamp station. A photo sensor is mounted just upstream of the nozzles to detect the presence of the container for controlling the operation of the applicator system. As will be explained in detail later in this application, other arrangements can be employed to mount the nozzles for applying the fluid either onto the container or onto the labels to be applied to the container.

Of course, if the spray system is utilized in a labeling method and apparatus that does not employ a UV curable adhesive, and thus omits the use of a UV lamp station, the photo sensor still will be employed, but mounted in a desired location for detecting the presence of a container onto which the "spot(s)" of fluid need(s) to be applied.

It should be understood that the number of nozzles that are utilized depends upon the number of adhesive void areas existing on one-or-more labels to be applied to a container.

In accordance with this invention, the dispensing system most desirably will permit operation at speeds of between 100 and 1,000 containers per minute. Moreover, in methods and apparatus employing a UV curable adhesive as the initial adhesive component applied to the labels, the fluid to be added as spots, or drops, also could be the same UV curable adhesive, one or more of its constituent components, or a different material that has the proper fluidic characteristics, remains fairly clear, and is compatible with food-grade applications.

As noted earlier, suitable fluids that are considered usable in this invention are adhesives that are compatible with the adhesives initially applied to the label, and non-adhesive material such as mineral oil, glycerins, fatty acid alcohol and vegetable oils.

Figure 6:
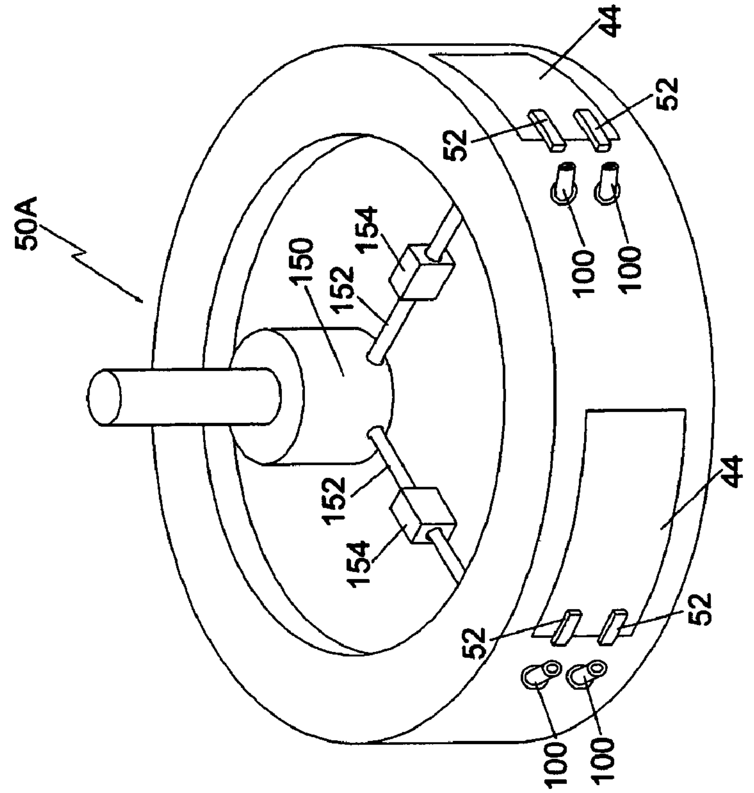
FIG. 6 is a schematic, isometric view of a modified second transfer assembly including spray nozzles for applying fluid directly on a container in predetermined regions for filling in adhesive free areas on a label to be applied to the container.
Figure 7:
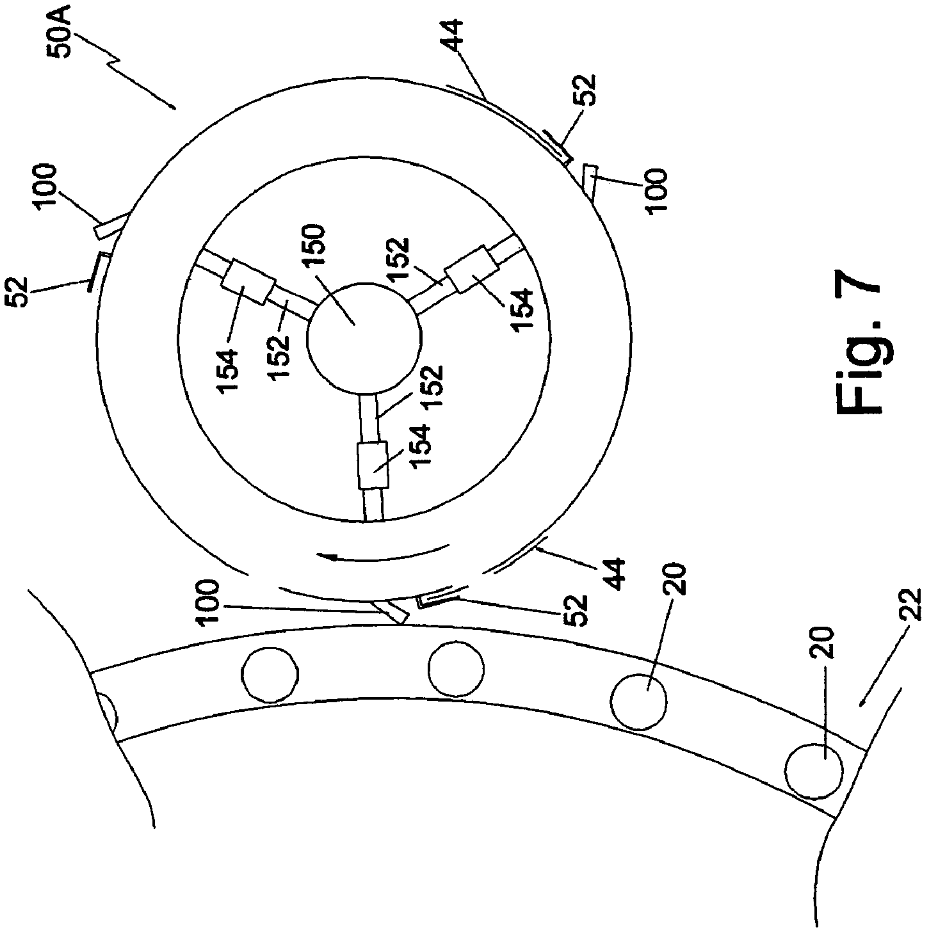
FIG. 7 is a plan view of the second transfer assembly illustrated in FIG. 6, showing its relationship to a turret carrying containers onto which labels are applied from the second transfer assembly.

Referring to FIGS. 6 and 7, an alternate embodiment is schematically illustrated, wherein the spray nozzles 100 are mounted directly on transfer assembly 50A. The transfer assembly 50A can include the same arrangement of gripper fingers 52 and cam-controlled operation of those fingers as the previously described transfer assembly 50. Transfer assembly 50A differs from the transfer assembly 50 by including a rotary union 150 for accommodating electrical and fluid inputs to control the spray operation through nozzles 100 mounted in the assembly, and also by including fluid conduits 152 connecting the fluid supply to the spray nozzles through solenoid valves 154 that control the operation of the spray nozzles 100. The system for controlling the flow of the fluid can be the same as the earlier described ITW Dynatec cold glue adhesive application system sold by Glue Machinery Corporation. As illustrated best in FIG. 7, the nozzles are oriented at an angle to direct the spray directly onto containers 20 carried on the turret 22 prior to the labels 44 being applied to the containers. As in the earlier described embodiment the spray nozzles are oriented to direct the fluid into regions on the container corresponding to the adhesive-free regions on the labels underlying the gripper fingers 52.

Figure 8:
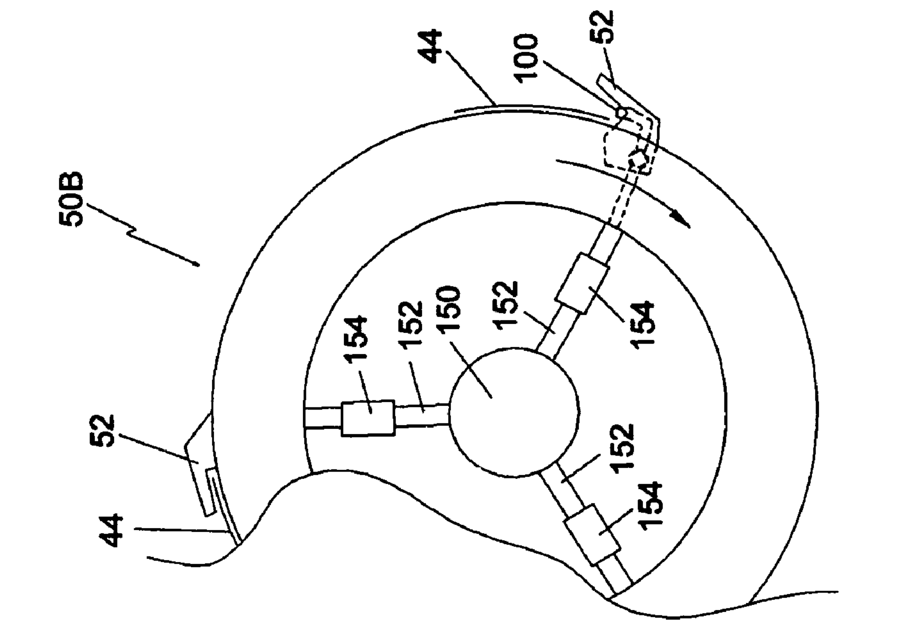
FIG. 8 is a fragmentary, schematic plan view of a further modified second transfer assembly including spray nozzles for applying fluid directly onto adhesive free areas on a label to be applied to a container.
Figure 9:
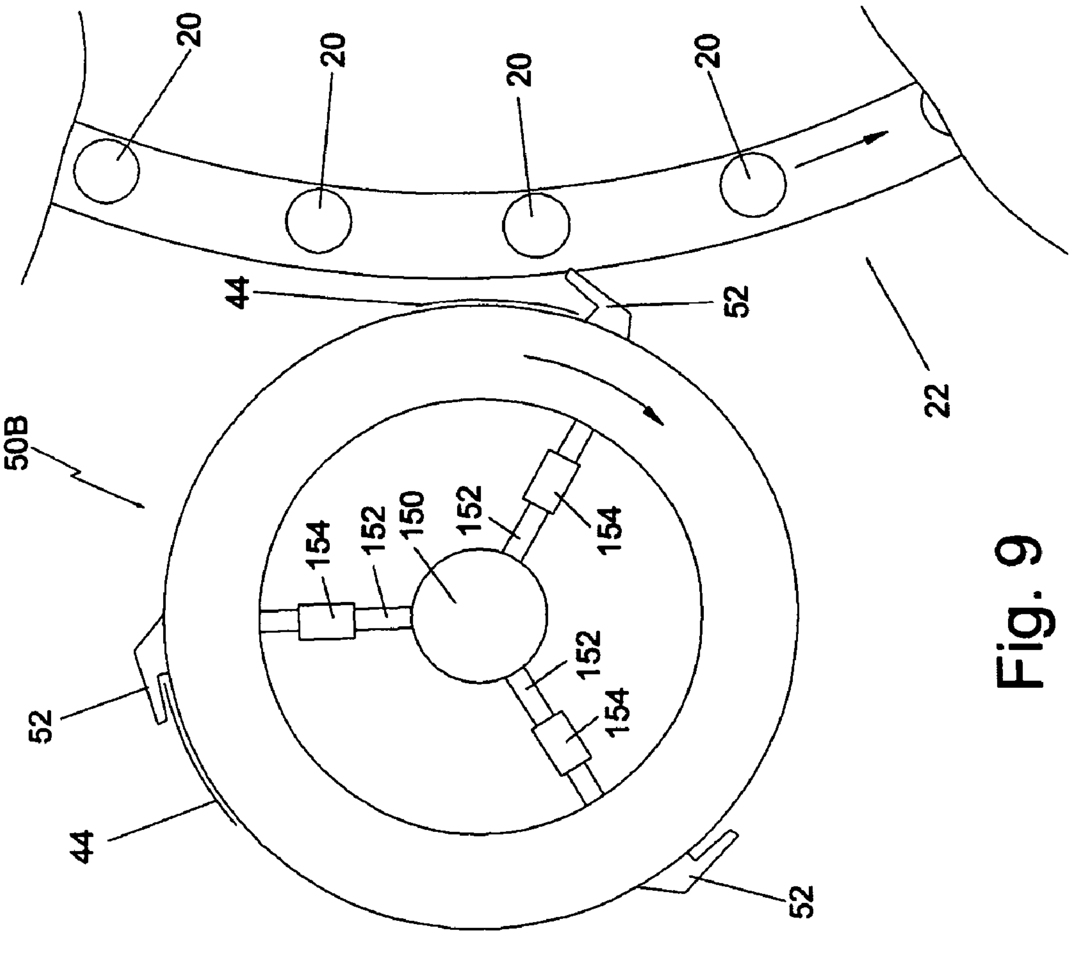
FIG. 9 is a plan view of the second transfer assembly illustrated in FIG. 8, showing its relationship to a turret carrying containers onto which labels are applied from the second transfer assembly.

In an alternative construction, illustrated in FIGS. 8 and 9, the spray nozzles 100 of the system are mounted to the gripper fingers 52 of transfer assembly 50B for directing drops of the desired fluid directly onto the voided areas on the label just prior to the transfer of the label to the container. That is, the fluid is directed onto each of the labels 44 in the regions underlying the gripper fingers 52 after the grip fingers release from the label and prior to the label being placed on the container. The transfer assembly 50B is essentially the same as the transfer assembly 50A, with the major difference being that the nozzles 100 are actually mounted through the gripper fingers 52 in the assembly 50B to direct the sprayed fluid directly onto the labels 44 secured by the gripper fingers, as opposed to directing the fluid onto the containers. That is, the transfer assembly 50B, like the transfer assembly 50A, includes a rotary union 150 for accommodating electrical and fluid inputs to control the spray operation through nozzles 100 mounted through the gripper fingers 52 in the assembly, and also includes fluid conduits 152 connecting the fluid supply to the spray nozzles through solenoid valves 154 that control the operation of the spray nozzles 100. The system for controlling the flow of the fluid can be the same as the earlier described ITW Dynatec cold glue adhesive application system sold by Glue Machinery Corporation. The principal downside of the arrangement illustrated in FIGS. 8 and 9 is that the applied fluid is more likely to accidentally be applied to the gripper itself, which could interfere with the proper operation of the apparatus.

If desired, the spray nozzles 100 can be directed through the gripper fingers, but oriented to direct the fluid directly onto the containers prior to applying the labels to the containers. This arrangement would be very similar to the arrangement illustrated in FIGS. 6 and 7, but with the nozzles 100 passing through the gripper fingers rather than adjacent those fingers. This should reduce the chance of accidentally applying glue to the gripper itself. Keep in mind that at the moment of label transfer between the gripper and bottle, the gripper fingers of the transfer assembly 50 are in correct registration with the bottle, such that the spray of fluid from nozzles connected to the gripper fingers will be applied to areas on the bottle that are located under the finger-gripped, adhesive-void areas of the label.

However, the preferred arrangement of employing an adhesive application system of the type described above (e.g., a ITW Dynatec cold adhesive application system), by mounting it adjacent the turret, is considerably less complex and is more in line with current fluid dispensing systems than mounting the system to the rotary transfer assemblies 50A and 50B. In these preferred systems one nozzle would be employed for each finger-gripped, adhesive-void area of the label or labels to be applied to a container.

Although the preferred spray system is an ITW Dynatec application system, there may be other similar equipment commercially available for directing a "spot" of adhesive into a desired area on a container to fill in a previously created adhesive-void on a label to be applied to that container. Thus, this invention is not intended to be limited to the use of any particular adhesive application system.

Without further elaboration, the foregoing will so fully illustrate our invention that others may, by applying current or future knowledge; readily adapt the same for use under various conditions of service.

The invention claimed is:

1. A method of correcting defects in a label resulting from a non-uniform application of adhesive to a surface of the label prior to applying the label to a container, said method including the following steps:

a. applying an adhesive to a surface of a label in a non-uniform manner to cause at least one region of said surface to be substantially devoid of said adhesive, and after applying said adhesive;

b. applying a fluid to said container in selected locations in substantial alignment only with regions on said surface that are substantially devoid of said adhesive to substantially fill said regions and after applying said fluid;

c. applying said label to said container.

2. The method of claim 1, including the step of selecting said fluid to have a clarity compatible with the clarity of said adhesive.

3. The method of claim 1, including the step of selecting an adhesive as said fluid.

4. The method of claim 1, including the step of selecting a radiation curable adhesive as said adhesive.

5. The method of claim 1, including the step of selecting a cold glue adhesive as said adhesive.

6. The method of claim 1, wherein the step of applying an adhesive to a surface of a label in a non-uniform manner is carried out by applying the adhesive to a surface of a transfer pad having at least one discontinuity therein and transferring the adhesive from the transfer pad to a surface of the label in regions other than regions overlying said discontinuities, regions of said label surface aligned with said discontinuities in the transfer pad being substantially devoid of said adhesive.

7. The method of claim 1, including the step of selecting a non-adhesive as said fluid.

8. The method of claim 7, including the step of selecting said fluid from the group consisting of mineral oil, glycerin, fatty acid alcohol, other glycols and vegetable oil.

9. The method of claim 8, wherein said other glycols include epoxy end-capped polypropylene glycol and alcohol flow aids.

10. The method of claim 9, wherein said alcohol flow aids include proproxylated neopentyl glycol.

* * * * *